United States Patent
Lynch

(10) Patent No.: US 10,843,633 B2
(45) Date of Patent: Nov. 24, 2020

(54) REMOVABLE VEHICLE DOOR POCKET

(71) Applicant: Toyota Motor Engineering & Manufacturing North America, Inc., Plano, TX (US)

(72) Inventor: Joshua S. Lynch, Temperance, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 25 days.

(21) Appl. No.: 16/290,266

(22) Filed: Mar. 1, 2019

(65) Prior Publication Data

US 2020/0276938 A1 Sep. 3, 2020

(51) Int. Cl.
*B60R 7/04* (2006.01)
*B60J 5/04* (2006.01)
*B60R 11/00* (2006.01)

(52) U.S. Cl.
CPC ............. *B60R 7/046* (2013.01); *B60J 5/0468* (2013.01); *B60R 2011/0021* (2013.01)

(58) Field of Classification Search
CPC ......... B60J 5/0413; B60J 5/0468; B60R 7/04; B60R 7/046
USPC ...................................................... 296/37.13
See application file for complete search history.

(56) References Cited

U.S. PATENT DOCUMENTS

| | | | | |
|---|---|---|---|---|
| 6,116,672 | A | * | 9/2000 | Cannon .................. B60R 7/046 224/547 |
| 6,120,077 | A | * | 9/2000 | Westphal ................ B60R 7/005 296/37.13 |
| 6,196,605 | B1 | | 3/2001 | Baldas et al. |
| 6,926,332 | B2 | * | 8/2005 | Youngs ................... B60R 7/046 224/277 |
| 7,328,825 | B2 | * | 2/2008 | Kaiser ..................... B60R 7/046 220/8 |
| 7,980,416 | B2 | * | 7/2011 | Chou ........................ B60R 7/06 16/361 |
| 2002/0185888 | A1 | | 12/2002 | Jonardi et al. |
| 2005/0218170 | A1 | | 10/2005 | Allmond |
| 2005/0252940 | A1 | | 11/2005 | Brandstetter et al. |
| 2006/0028043 | A1 | * | 2/2006 | Zeidman .................. B60R 7/12 296/37.13 |
| 2009/0021037 | A1 | | 1/2009 | Smetham et al. |
| 2011/0139846 | A1 | | 6/2011 | Lucas et al. |
| 2016/0129950 | A1 | * | 5/2016 | Krajenke ................ E05C 1/002 296/37.6 |

FOREIGN PATENT DOCUMENTS

JP 2011240878 A 12/2011

* cited by examiner

*Primary Examiner* — Jason S Daniels
(74) *Attorney, Agent, or Firm* — Christopher G. Darrow; Darrow Mustafa PC

(57) ABSTRACT

A pocket is structured to be removably securable to a vehicle door. In one arrangement, the pocket includes at least one positioning element receiving cavity structured to extend horizontally or substantially horizontally when the pocket is attached to a vehicle door.

9 Claims, 4 Drawing Sheets

REMOVABLE VEHICLE DOOR POCKET

TECHNICAL FIELD

The present invention relates to vehicle doors and, more particularly, to a storage area provided in a trim panel of a vehicle door.

BACKGROUND

A vehicle door may include an interior trim panel which incorporates a pocket for storing items for ready access by a driver or front seat passenger. A vehicle occupant may choose to store any of a wide variety of items in the pocket, including maps, food, beverages, and other items. Over time, the pocket interior may collect dust and food items may spill into the pocket interior. It may be difficult to see and/or reach into the pocket to clean the pocket interior.

SUMMARY

In one aspect of the embodiments described herein, a pocket is structured to be removably securable to a vehicle door. In one arrangement, the pocket includes at least one positioning element receiving cavity structured to extend horizontally or substantially horizontally when the pocket is attached to a vehicle door.

In another aspect of the embodiments described herein, a vehicle door assembly is provided. The door assembly includes a door having an interior trim panel with a cavity formed therein. A pocket is structured to be removably securable within the trim panel cavity. A positioning mechanism is structured to position the pocket within the trim panel cavity. A releasable securement mechanism is structured to be actuatable after the pocket has been positioned within the trim panel cavity, to secure the pocket within the trim panel cavity.

DETAILED DESCRIPTION

Figure 1:
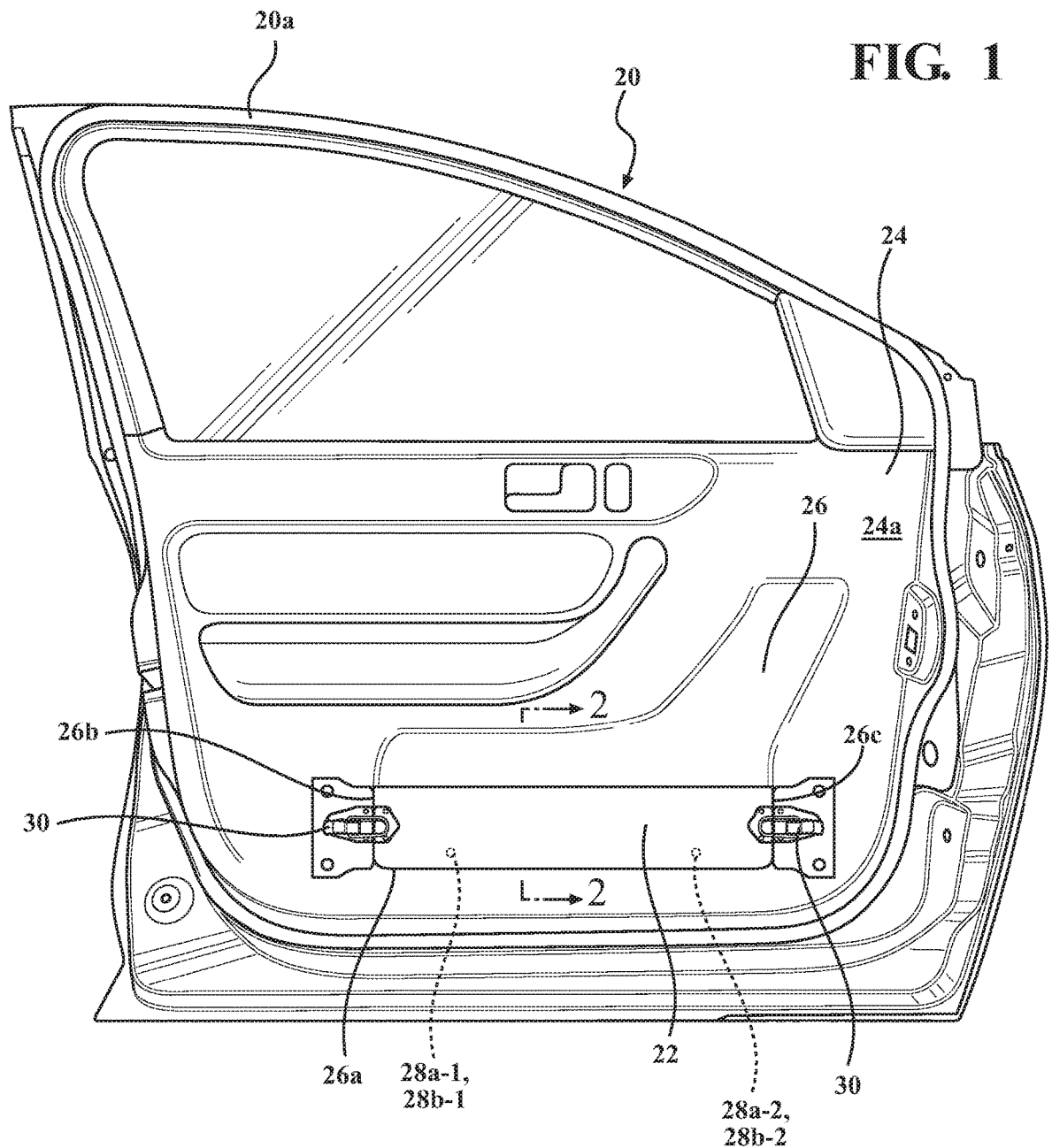
FIG. 1 is a schematic side view of a vehicle door assembly incorporating a removable pocket in accordance with an embodiment described herein.

Embodiments described herein relate to a pocket structured to be removably securable to a trim panel cavity formed in a vehicle door trim panel. In one embodiment, the pocket includes at least one positioning element receiving cavity structured to extend horizontally or substantially horizontally when the pocket is attached to a vehicle door. A pocket positioning element mounted in the trim panel is received in each positioning element receiving cavity when the pocket is installed in the trim panel cavity. The positioning element receiving cavities and the pocket positioning elements may be arranged so as to aid in maintaining the pocket in a horizontal orientation during removal of the pocket from the trim panel cavity. This aids in preventing inadvertent spillage of any contents of the pocket prior to cleaning the pocket. A releasable securement mechanism (such as one or more latches, for example) is structured to secure the pocket within the trim panel cavity after the pocket has been positioned within the trim panel cavity. In another embodiment, the pocket includes at least one positioning element structured to extend horizontally or substantially horizontally when the pocket is attached to a vehicle door. Positioning element receiving cavities structured to receive these pocket positioning element(s) may be formed in the trim panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 2:
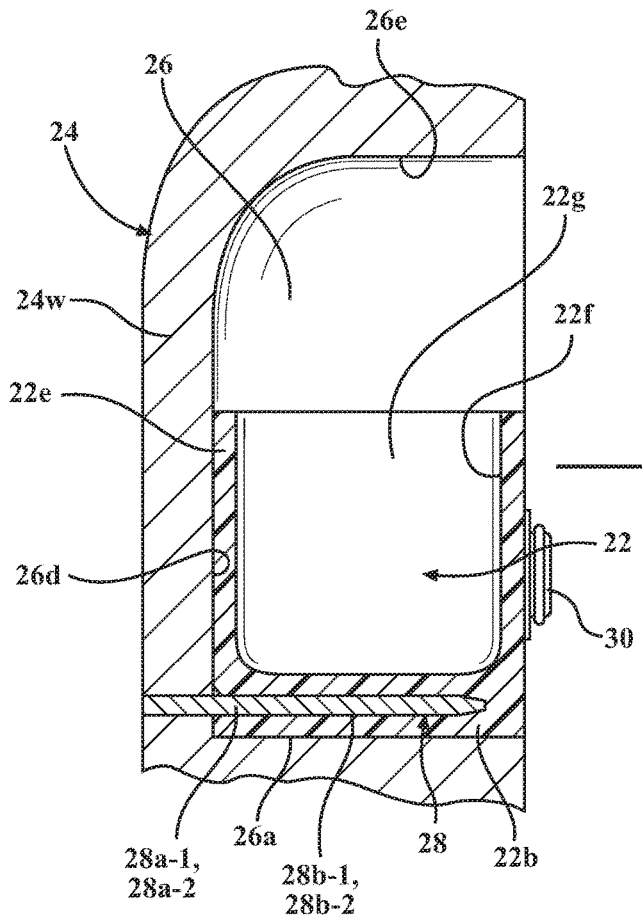
FIG. 2 is a schematic cross-sectional view of a portion of the door assembly shown in FIG. 1.
Figure 2:
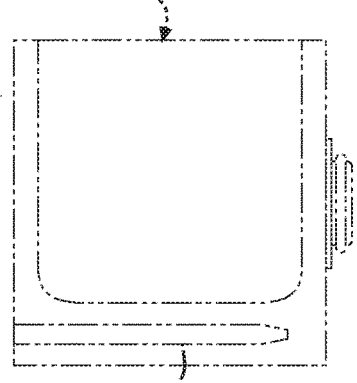

FIG. 1 is a schematic side view of a vehicle door assembly 20 viewed from the perspective of an interior of the vehicle, incorporating a removable pocket 22 in accordance with an embodiment described herein. FIG. 2 is a schematic cross-sectional view of a portion of the door assembly 20 shown in FIG. 1. The vehicle door assembly 20 may include a vehicle door 20a having an interior trim panel 24 with a cavity 26 formed therein. Pocket 22 is structured to be removably securable within the cavity 26. A positioning mechanism (generally designated 28) may be structured to position the pocket 22 within the cavity. A releasable securement mechanism 30 may be structured to be actuatable after the pocket 22 has been positioned within the trim panel cavity 26, to secure the pocket 22 within the trim panel cavity 26.

The trim panel 24 may have an outer surface 24a structured to face an interior of the vehicle when the door assembly is installed on a vehicle and the door is closed. Trim panel 24 may have a wall thickness 24w which may vary over the extent of the part. Trim panel cavity 26 may have a bottom surface 26a structured to support the pocket 22 when the pocket is secured in the cavity 26. Trim panel cavity 26 may also have opposed side surfaces 26b, 26c extending from the bottom surface 26a, a rear surface extending 26d from the bottom surface 26a and between the side surfaces 26b, 26c, and one or more overhead surfaces 26e extending from the rear surface ands side surfaces. Overhead surfaces 26e are structured to overlie or reside above the pocket 22 when the pocket is secured in the trim panel cavity 26.

Figure 2A:
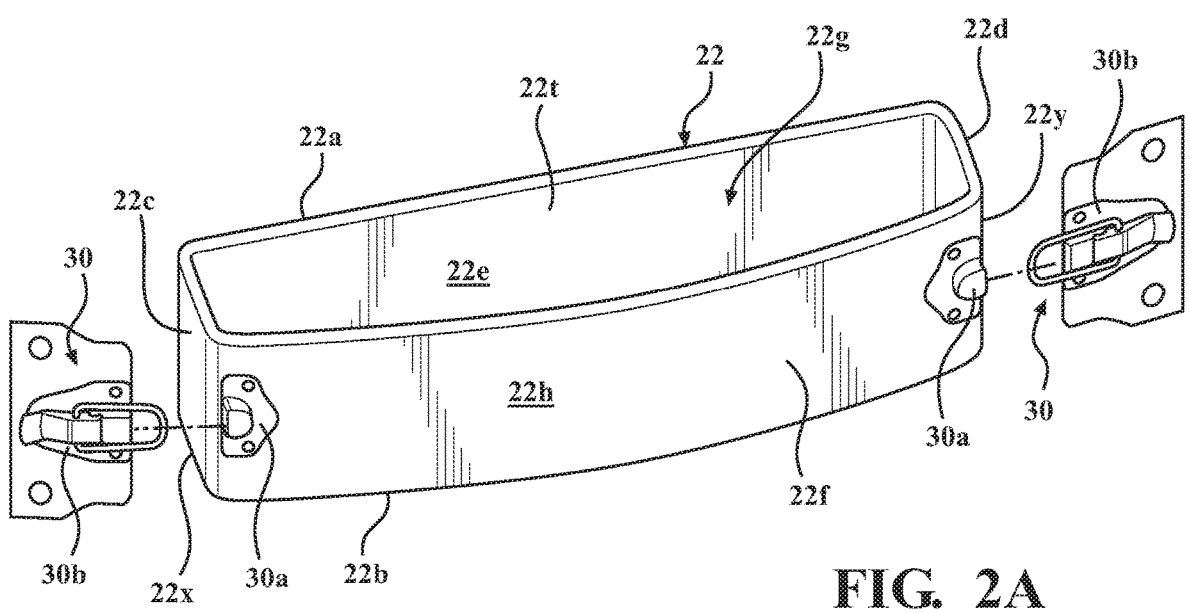
FIG. 2A is a perspective view of one embodiment of a pocket described herein, showing characteristics of a body of the pocket.

FIG. 2A is a perspective view the pocket 22 described herein, showing characteristics of a body 22a of the pocket 22 common to all of the pocket embodiments described herein. Referring to FIGS. 2 and 2A, pocket body 22a may include a bottom wall 22b, a pair of opposed sidewalls 22c, 22d extending from the bottom wall 22b, a rear wall 22e extending from the bottom wall 22b and between the side walls 22c, 22d, and a front wall 22f extending from the bottom wall 22b opposite the rear wall 22e. Bottom wall 22b, side walls 22c, 22d, rear wall 22e and front wall 22f may be connected to each other so as to define a fluid-tight pocket receptacle 22g therebetween. Receptacle 22g may be structured to receive trash, contain spilled liquids, and to otherwise enable positioning therein of objects to be stored. Bottom wall 22b, side walls 22c, 22d, rear wall 22e and front wall 22f may also be connected to each other so as to define an opening 22t leading from an exterior of the pocket into the receptacle 22g. An outer surface 22h of pocket front wall 22f may be structured to face an interior of the vehicle when the door assembly 20 is installed on a vehicle, the door is closed, and the pocket 22 is secured within the trim panel cavity 26.

Referring to the cross-sectional view of FIG. 2, pocket 22 may also include at least one positioning element receiving cavity 28b structured to extend horizontally or substantially horizontally when the pocket 22 is attached to the vehicle door 20a. In particular arrangements, the at least one positioning element receiving cavity 28b extends into the pocket bottom wall 22b. The embodiment of FIGS. 1-2A shows a pocket 22 having two spaced apart positioning element receiving cavities 28b-1, 28-b2 formed in the bottom wall 22b.

Referring to FIG. 2, the pocket 22 may be structured to be removably securable within the trim panel cavity 26 in a first orientation. The first orientation may be an end use orientation of the pocket 22 which is configured for storing and/or retaining items therein when the door assembly 20 is installed on a vehicle. In one or more arrangements, the first orientation may be an orientation in which the pocket front wall 22f and rear wall 22e extend vertically when the door assembly 20 is installed on a vehicle. In one or more arrangements, the first orientation may be an orientation in which the pocket opening 22t faces upwardly.

The positioning mechanism 28 may be structured to aid in final positioning or alignment of the pocket 22 within the trim panel cavity 26 so as to facilitate actuation of the releasable securement mechanism 30 to secure the pocket 22 within the cavity 26. In one or more arrangements, the positioning mechanism 28 may also be structured to maintain the pocket 22 in the first orientation during insertion of the pocket 22 into the trim panel cavity 26, and also to maintain the pocket 22 in the first orientation during withdrawal of the pocket from the cavity 26. This helps ensure that objects, liquids, etc. in the pocket do not spill from or exit the pocket 22 during removal of the pocket from the trim panel cavity 26.

Referring to FIG. 2, in one or more arrangements, each positioning mechanism 28 may include at least one pocket positioning element 28a extending from one of the trim panel 24 and a wall of the pocket 22, and at least one positioning element receiving cavity 28b extending into the other one of the wall of the pocket 22 and the trim panel 24. Each positioning element receiving cavity 28b may be configured to receive an associated pocket positioning element 28a therein. FIGS. 1 and 2 show a pair of positioning element receiving cavities 28b-1, 28b-2 extending into the pocket bottom wall 22b, and an associated pair of pocket positioning elements 28a-1, 28a-2 extending into associated ones of the positioning element receiving cavities 28b-1, 28b-2 from the trim panel 24. Each of pocket positioning elements 28a-1, 28a-2 may be structured to contact walls of a positioning element receiving cavity 28b into which it is inserted in a close sliding fit, structured to enable free movement of the pocket positioning element 28a into and out of the positioning element receiving cavity 28b, while essentially preventing the pocket positioning element 28a from moving laterally (i.e., in a direction perpendicular to an axis of insertion of the pocket positioning element 28a into the receiving cavity 28b). Ends of the pocket positioning elements 28a-1, 28a-2 may be tapered to facilitate entry of the positioning elements into associated receiving cavities 28b-1, 28b-2. Similarly, ends of the receiving cavities 28b-1, 28b-2 into which the positioning elements 28a-1, 28a-2 are inserted may be countersunk to facilitate entry of the positioning elements 28a into associated receiving cavities. Each pocket positioning element 28a may also be secured to one of the trim panel 24 and the pocket 22 so as to minimize an ability of the portion of the pocket positioning element 28a to deflect or otherwise move with respect to the part (trim panel 24 or pocket 22) in which it is secured.

The pocket may be partially inserted into the trim panel cavity until the positioning mechanism elements are is engaged, after which insertion may continue until the pocket is fully inserted. The positioning mechanism may aid in guiding the pocket into a position in the trim panel cavity in which the latches may be engaged to retain the pocket within the trim panel cavity. In the embodiments shown in FIGS. 1, 2, and 3, the positioning mechanism may also aid in maintaining the pocket in the first (end-use) orientation during insertion and withdrawal of the pocket.

In one or more arrangements, the pocket positioning elements 28a may be in the form of pins, bars having rectangular cross-sections, or other cross-sectional shapes, and the positioning element receiving cavities 28b may have complementary shapes for receiving the pocket positioning elements 28a therein. The pocket positioning elements 28a may be formed from metals such as steel or any other suitable materials. The lengths of the pocket positioning elements 28a and the receiving cavities 28b may also be specified so as to maximize the lengths over which the pocket positioning elements 28a are in contact with the walls of the positioning element receiving cavities 28b. Maximization of this contact or engagement length and the close sliding fits aid in stabilizing the pocket orientation during insertion and withdrawal of the pocket 22 into the trim panel cavity 26, helping to maintain the pocket 22 in the first orientation during insertion and withdrawal.

Figure 3:
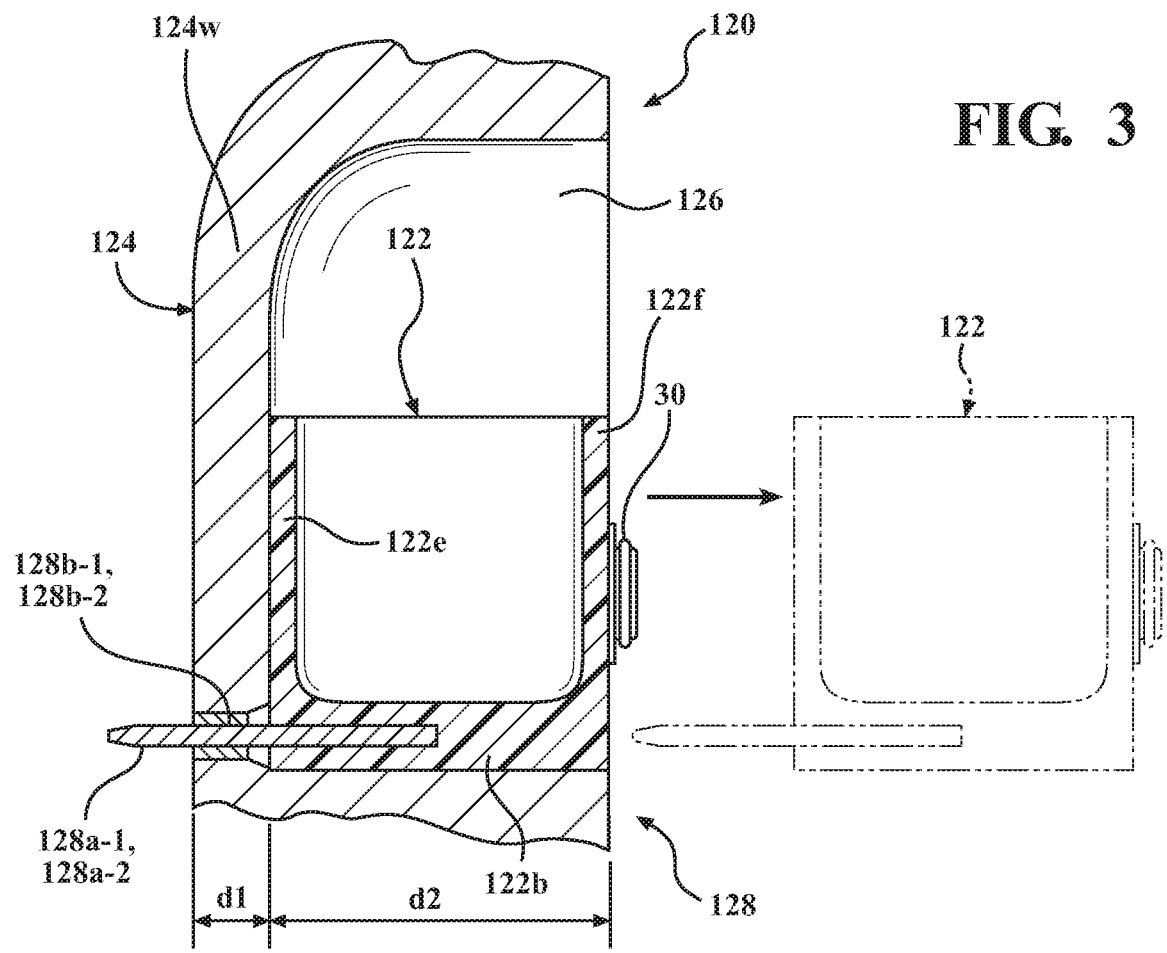
FIG. 3 is a schematic cross-sectional view of a portion of a vehicle door assembly in accordance with another embodiment described herein.

Elements shown in FIG. 3 may be as described previously with respect to FIG. 2 unless otherwise shown or described herein. FIG. 3 is a schematic cross-sectional view of a portion of another embodiment 120 of a door assembly similar to door assembly 20, showing an embodiment 128 of the positioning mechanism in which one or more pocket positioning elements 128a are secured in the pocket 122, and associated positioning element receiving cavities 128b are formed in the trim panel 124. In particular arrangements, the lengths of the pocket positioning elements 128a may be specified in accordance with a thickness d1 of a trim panel wall 124w in which the receiving cavities are formed and the depth d2 of trim panel cavity 126 so that, during withdrawal of the pocket 122 from the trim panel cavity 126, at least portions of the positioning elements 128a remain within their associated receiving cavities 126b until the pocket 122 has been completely removed from (and is out of contact with) the trim panel 124, as shown by the phantom line in FIG. 3. This arrangement provides support and stabilization for the pocket 122 to help maintain the pocket in the first orientation shown until it has been completely removed from the trim panel cavity 126.

Figure 4:
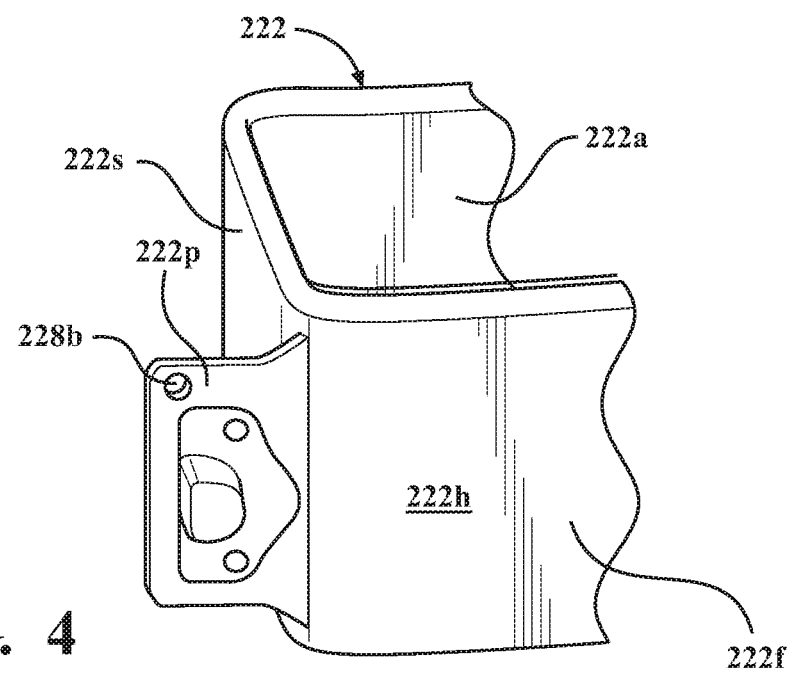
FIG. 4 is a perspective view of a portion of another embodiment of a pocket described herein.

Referring to FIG. 4, in another embodiment 222 of the pocket, a pair of projecting walls or flanges 222p and 222r (not shown) extend from opposed first and second ends of the pocket body 222a, with a positioning element receiving cavity 228b extending through each flange of the pair of flanges. FIG. 4 shows a flange 222p at a first end 222x of the pocket body 222a. A similar flange may project from an opposite end (not shown) of the pocket body 222a. Each of positioning element receiving cavities 228b may be structured to extend horizontally or substantially horizontally when the pocket 222 is attached to the vehicle door by mounting the pocket in a trim panel cavity 26. Flanges 222p and 222r may be structured to be flush with the outer surface 222h of pocket front wall 222f when the pocket 222 is secured in trim panel cavity 26. Positioning element receiving cavities 228b may be structured to receive therein associated ones of a pair of spaced apart positioning mechanism pins or tabs (not shown) extending from the trim panel 24.

Figure 5A:
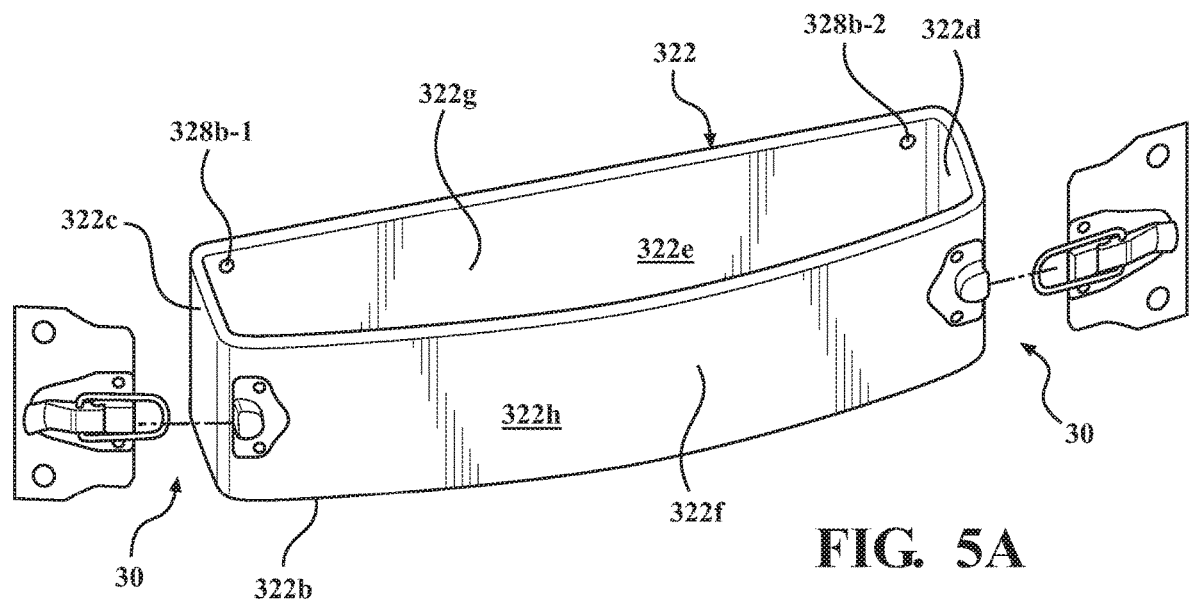
FIG. 5A is a perspective view of another embodiment of a pocket described herein.
Figure 5B:
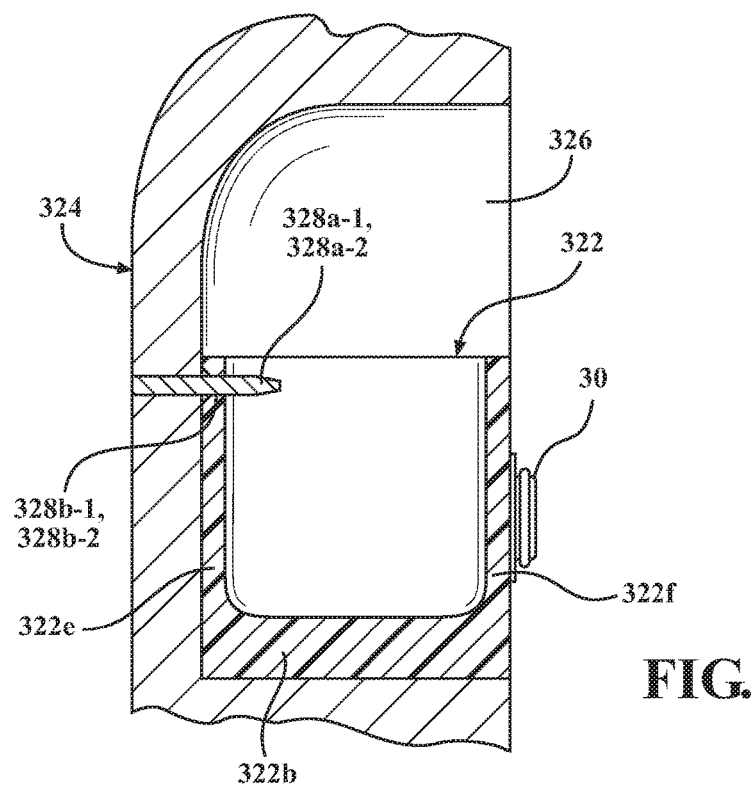
FIG. 5B is a schematic cross-sectional view of a portion of a door assembly incorporating the pocket embodiment shown in FIG. 5A.

Elements shown in FIGS. 5A and 5B may be as described previously with respect to FIG. 2 unless otherwise shown or described herein. Referring to FIGS. 5A and 5B, in another embodiment 322 of the pocket, a pair of positioning element receiving cavities 328b-1, 328b-2 extend into the rear wall 322e, with each positioning element receiving cavity 328b being structured to extend horizontally or substantially horizontally when the pocket 322 is attached to a vehicle door by securing the pocket 322 within the trim panel cavity 326. Positioning element receiving cavities 328b-1, 328b-2 may be structured to receive therein an associated pair of spaced apart positioning mechanism pins or tabs 328a-1, 328a-2 extending from the trim panel 24.

Referring to the drawings, and particularly FIG. 2A, a releasable securement mechanism 30 may be attached to each embodiment of the pocket and may be structured to be actuatable after the pocket has been positioned within the trim panel cavity 326, to secure the pocket within the cavity. In one or more arrangements, the securement mechanism 30 may be in the form of a pair of latches or buckles, with one latch 30 mounted proximate each of the first and second ends 22x, 22y of the pocket. First portions 30a of the latches 30 may be attached to the pocket outer surface 22h at each of pocket ends 22x and 22y, and second portions 30b of the latches may be mounted to the trim panel 24 opposite associated ones of the first portions 30a of the latches 30. The latch second portions 30b may be configured to engage the latch first portions 30a after the pocket 22 has been fully inserted into the trim panel cavity 26, to secure the pocket within the trim panel cavity 26. Any suitable type(s) of latches may be used. For convenience, the latches 30 may each be configured to be actuatable with a single hand of a user. When the latches are engaged, the pocket is releasably secured in the trim panel cavity with the pocket front wall outer surface flush with the trim panel outer surface 24a.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle door assembly comprising:
   a door including an interior trim panel having a cavity formed therein;
   a pocket structured to be removably securable within the trim panel cavity; and
   a positioning mechanism structured to position the pocket within the trim panel cavity the positioning mechanism including at least one pocket positioning element extending in a first direction from one of the trim panel and a wall of the pocket, and at least one positioning element receiving cavity extending into the other one of the wall of the pocket and the trim panel, wherein the at least one pocket positioning element and the at least one positioning element receiving cavity are structured so that a direction of insertion of the at least one pocket positioning element into the at least one positioning element receiving cavity is in the first direction.

2. The vehicle door assembly of claim 1 wherein the least one positioning element receiving cavity extends into the at least one pocket wall, and the at least one pocket positioning element extends from the trim panel.

3. The vehicle door assembly of claim 2 including a first positioning element receiving cavity extending into the at least one pocket wall and positioned so as to receive therein a first pocket positioning element extending from the trim panel when the pocket is secured within the trim panel cavity, and a second positioning element receiving cavity extending into the at least one pocket wall and positioned so as to receive therein a second pocket positioning element extending from the trim panel when the pocket is secured within the trim panel cavity.

4. The vehicle door assembly of claim 3 wherein the at least one pocket wall comprises a first flange extending from a first end of the pocket and a second flange extending from a second end of the pocket opposite the first end.

5. The vehicle door assembly of claim 3 wherein the at least one pocket wall comprises a rear wall of the pocket.

6. The vehicle door assembly of claim 1 wherein the least one positioning element receiving cavity extends into the trim panel, and the at least one pocket positioning element extends from the at least one pocket wall.

7. The vehicle door assembly of claim 6 wherein the at least one positioning element receiving cavity and the at least one pocket positioning element are structured so that at least a portion of the at least one pocket positioning element is received in the at least one positioning element receiving cavity until the pocket has been completely withdrawn from the trim panel cavity.

8. A vehicle door assembly comprising:
- a door including an interior trim panel having a cavity formed therein;
- a pocket structured to be removably securable within the trim panel cavity; and
- a positioning mechanism structured to position the pocket within the trim panel cavity, the positioning mechanism including at least one pocket positioning element extending from one of the trim panel and the at least one pocket wall, and at least one positioning element receiving cavity extending into the other one of the at least one pocket wall and the trim panel, the at least one positioning element receiving cavity being configured to receive the at least one pocket positioning element therein, and wherein the at least one positioning element receiving cavity and the at least one pocket positioning element are structured so that at least a portion of the at least one pocket positioning element is received in the at least one positioning element receiving cavity until the pocket has been completely withdrawn from the trim panel cavity.

9. A vehicle door assembly comprising:
- a door including an interior trim panel having a cavity formed therein;
- a pocket structured to be removably securable within the trim panel cavity in an end use orientation of the pocket;
- a positioning mechanism structured to position the pocket within the trim panel cavity, wherein the positioning mechanism is structured to maintain the pocket in the end use orientation during insertion of the pocket into the trim panel cavity, and wherein the positioning mechanism is structured to maintain the pocket in the end use orientation during withdrawal of the pocket from the trim panel cavity; and
- a releasable securement mechanism structured to be actuatable after the pocket has been positioned within the trim panel cavity, to secure the pocket within the trim panel cavity.

* * * * *